United States Patent
Wei

(10) Patent No.: US 10,764,471 B1
(45) Date of Patent: Sep. 1, 2020

(54) CUSTOMIZED GRAYSCALE CONVERSION IN COLOR FORM PROCESSING FOR TEXT RECOGNITION IN OCR

(71) Applicant: Konica Minolta Business Solutions U.S.A., Inc., San Mateo, CA (US)

(72) Inventor: Junchao Wei, San Mateo, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/585,669

(22) Filed: Sep. 27, 2019

(51) Int. Cl.
| | |
|---|---|
| H04N 1/60 | (2006.01) |
| H04N 1/40 | (2006.01) |
| H04N 1/411 | (2006.01) |

(52) U.S. Cl.
CPC ....... *H04N 1/6008* (2013.01); *H04N 1/40012* (2013.01); *H04N 1/4115* (2013.01); *H04N 1/6072* (2013.01)

(58) Field of Classification Search
CPC .... G06K 2209/01; G06K 9/38; G06T 11/001; G06T 2207/30176; G06T 7/11; G06T 7/194; G09G 2320/0606; G09G 2320/0626; G09G 2320/066; G09G 2320/0666; G09G 2320/0673; G09G 5/02; H04N 9/69; H04N 9/73
USPC .......................................... 358/515; 382/180
See application file for complete search history.

(56) References Cited

U.S. PATENT DOCUMENTS

| | | | | |
|---|---|---|---|---|
| 6,789,077 | B1 * | 9/2004 | Slaughter | G06F 9/465 |
| 7,119,760 | B2 * | 10/2006 | Edge | G06T 11/001 |
| | | | | 345/2.1 |
| 7,907,778 | B2 * | 3/2011 | Xiao | G06K 9/38 |
| | | | | 382/168 |
| 8,200,617 | B2 * | 6/2012 | Spivack | G06F 40/186 |
| | | | | 707/602 |
| 8,385,971 | B2 * | 2/2013 | Rhoads | G06K 9/6253 |
| | | | | 455/556.1 |
| 8,786,845 | B2 * | 7/2014 | Lynch | G01C 21/32 |
| | | | | 356/139.01 |
| 8,886,206 | B2 * | 11/2014 | Lord | G06K 9/00993 |
| | | | | 455/450 |

(Continued)

OTHER PUBLICATIONS

Wikipedia, "Grayscale", https://en.wikipedia.org/wiki/Grayscale, 5 pages, printed from the Internet on Sep. 10, 2019.

(Continued)

*Primary Examiner* — Negussie Worku
(74) *Attorney, Agent, or Firm* — Chen Yoshimura LLP

(57) ABSTRACT

In a color to grayscale image conversion particularly method suitable for processing color document images such as forms, the color image is analyzed to determined which of the red, green and blue channels are the most dominant, second most dominant, and least dominant channels, based on the amount of information contained in each channel. Then, coefficients are assigned to the three channels, where the coefficient for the most dominant channel is smaller than the coefficient for the second most dominant color channel, which is in turn smaller than the coefficient for the least dominant color channel. The grayscale pixel value is then calculated using a linear combination of the red, green and blue pixel values weighted by their assigned coefficients. In one example, the ratio of the coefficients for the least dominant, the second most dominant and the most dominant channels is 10:3:1.

18 Claims, 1 Drawing Sheet

(56) References Cited

U.S. PATENT DOCUMENTS

| | | | | |
|---|---|---|---|---|
| 8,929,877 B2* | 1/2015 | Rhoads | ............... | H04W 4/70 |
| | | | | 455/420 |
| 9,613,155 B2* | 4/2017 | Hill | ............... | G06F 3/0482 |
| 10,192,099 B2* | 1/2019 | Agaian | ............... | A61B 5/7257 |
| 10,499,845 B2* | 12/2019 | Do | ............... | G06K 9/38 |
| 2010/0246947 A1* | 9/2010 | Ma | ............... | G06K 9/38 |
| | | | | 382/167 |
| 2012/0050828 A1* | 3/2012 | Ohk | ............... | H04N 1/6072 |
| | | | | 358/518 |
| 2012/0092359 A1* | 4/2012 | O'Brien-Strain | ......... | G06T 7/11 |
| | | | | 345/589 |
| 2015/0086112 A1* | 3/2015 | Tian | ............... | G06K 9/34 |
| | | | | 382/173 |
| 2019/0266709 A1* | 8/2019 | Takeda | ............... | A61B 6/5205 |

OTHER PUBLICATIONS

Vitor, "Entropy and images", https://jeanvitor.com/image-entropy-value-visualization/, 10 pages, printed from the Internet on Oct. 7, 2019.

* cited by examiner

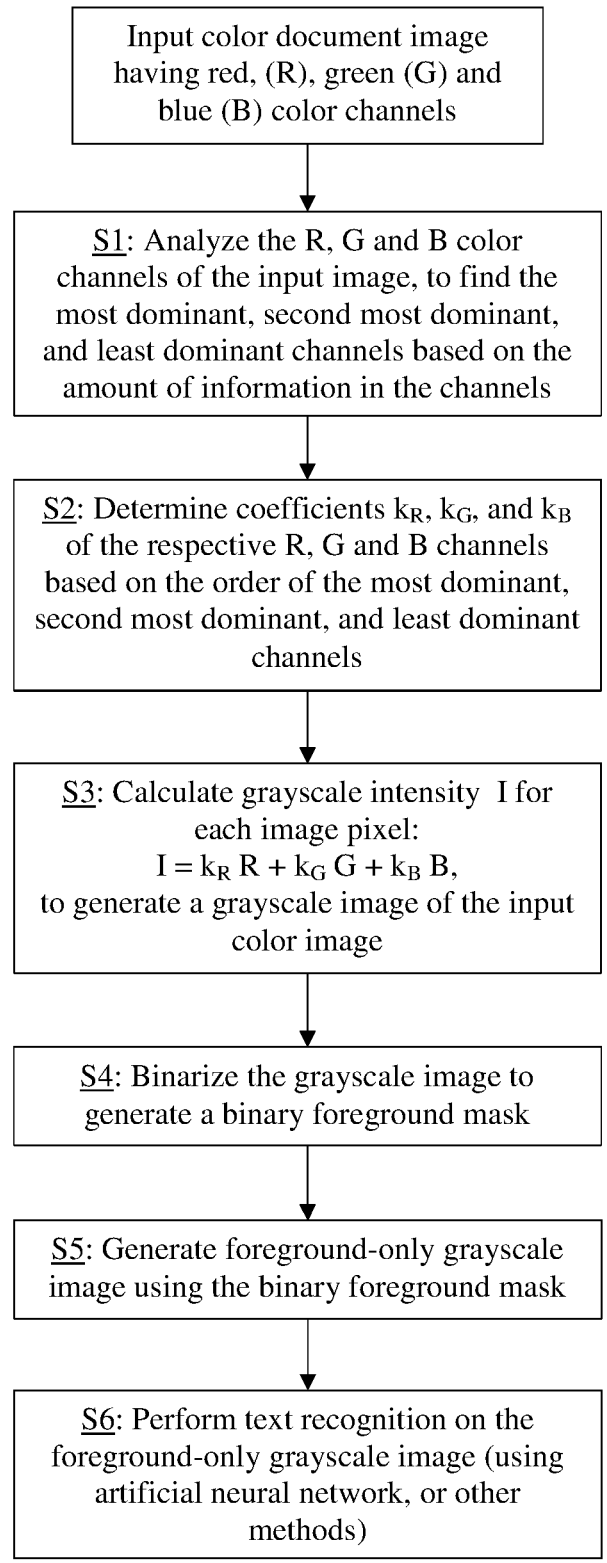

CUSTOMIZED GRAYSCALE CONVERSION IN COLOR FORM PROCESSING FOR TEXT RECOGNITION IN OCR

BACKGROUND OF THE INVENTION

Field of the Invention

This invention relates to document image processing, and in particular, it relates to a grayscale conversion method suitable for processing color forms for text recognition.

Description of Related Art

Artificial neural networks have been used to perform OCR (optical character recognition). To develop a text recognition engine using artificial neural networks, well-designed training images and labeling of training images are required. Usually, training images can be generated by multiple different types of equipment with distinct imaging modalities. For example, web cameras can generate natural scene color images without white background correction, while scanners can produce white background-corrected color images. Thus, to train the artificial neural network models, there is often a need to use different pipelines for preparing training samples that come from different imaging modalities, which can be inefficient and is not an ideal strategy for processing text images. Also, training a network model with different color images without normalization may cause model over-fitting, and the method may be hard to generalize. Therefore, in many text recognition methods, color images are first converted to grayscale images before they are labeled and used as training images to train the network model. Many text recognition algorithms that are not based on neural network also rely on color to grayscale conversion.

Color values are typically expressed as a set of red, green, blue (RGB) intensity values, referred to as color channels. Conventional RGB color to grayscale conversion uses formulas that assign different coefficient values to the R, G and B channels, and calculate the grayscale intensity (luminance) value as a linear sum of the three channels weighted by the respective coefficients. Such grayscale conversion models are typically informed by characteristics of the human eyes' perceptual responses to different colors. For example, it is well known that the human eyes are the most sensitive to green, so many conventional grayscale conversion methods assign the highest coefficient value to green. For example, in some color to grayscale conversion algorithms, the ratio of the coefficients assigned to the R, G and B channels is approximately 3:10:1. Such grayscale conversion algorithms are suitable for a majority of natural scene images to visualize contents using grayscale intensity (luminance) values.

SUMMARY

The present invention is directed to a color to grayscale image conversion method that substantially obviates one or more of the problems due to limitations and disadvantages of the related art.

An object of the present invention is to provide a grayscale conversion method that is practical and suitable for processing color document images, particularly color forms. Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method for processing a color document image, the color document image containing red, green and blue color channels, the method including: analyzing each of the red, green and blue color channels to determine which of the red, green and blue color channels are a most dominant color channel, a second most dominant color channel, and a least dominant color channel; based on the determination of which of the red, green and blue color channels are the most dominant color channel, the second most dominant color channel, and the least dominant color channel, assigning a coefficient to each of the red, green and blue color channels, wherein the coefficient assigned to the most dominant color channel is smaller than the coefficient assigned to the second most dominant color channel, and the coefficient assigned to the second most dominant color channel is smaller than the coefficient assigned to the least dominant color channel; and converting the color document image to a grayscale document image, by calculating a pixel intensity value I for each pixel of the grayscale document image using $I = k_R R + k_G G + k_B B$, where R, G, B are respectively the pixel values of the red, green and blue color channels of the corresponding pixel of the color document image, and $k_R$, $k_G$, and $k_B$ are respectively the coefficients assigned to the red, green and blue color channels.

In some embodiments, the step of analyzing each of the red, green and blue color channels includes determining an amount of information contained in each of the red, green and blue color channels, and wherein the color channel that contains the most amount of information is determined to be the most dominant color channel, the color channel that contains the second most amount of information is determined to be the second most dominant color channel, and the color channel that contains the least amount of information is determined to be the least dominant color channel. The amount of information contained in each of the red, green and blue color channels may be determined by calculating an entropy of the respective color channel.

In some embodiments, a ratio of the coefficient assigned to the second most dominant color channel to the coefficient assigned to the most dominant color channel is in a range of 2:1 to 4:1, and a ratio of the coefficient assigned to the least dominant color channel to the coefficient assigned to the second most dominant color channel is in a range of 2:1 to 5:1.

In another aspect, the present invention provides a method for processing a color document image, the color document image containing red, green and blue color channels, the method including: converting the color document image to a grayscale document image, by calculating a pixel intensity value I for each pixel of the grayscale document image using $I = k_R R + k_G G + k_B B$, where R, G, B are respectively the pixel values of the red, green and blue color channels of the corresponding pixel of the color document image, and $k_R$, $k_G$, and $k_B$ are respectively the coefficients of the red, green and blue color channels, wherein, $k_R$ and $k_G$ satisfy the following: $2 \leq k_R/k_G \leq 5$.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates an image processing method for converting a color document image to a grayscale document image according to an embodiment of the present invention.

DETAILED DESCRIPTION OF PREFERRED EMBODIMENTS

Conventional color to grayscale conversion algorithms, however, are often not suitable for converting a color form to grayscale for the purpose of color form preprocessing for text recognition. For example, it is observed that for color forms, the text (foreground) sometimes appears in a color that has a high contrast with a background color. Here, the background color of the form refers to the color of the paper (or its digital equivalent) that the form is printed on. Theoretically, the highest contrast between the foreground and the background colors is black (lowest luminance) and white (highest luminance). However, in some printed forms, the text may appear in a color over a background of a lighter color or another color. For instance, a form may use a dark red color for text and a light red color for background, or a light green color for text and a dark green color for background, or a blue color for text and a pink color for background, or the foreground may include a red seal over another colored background, etc. When a conventional color to grayscale conversion algorithm, e.g., one in which the ratio of the linear coefficients for the R, G and B channels is approximately 3:10:1, is applied to such images, due to the high coefficient value for green, a light green color foreground may be converted to a relatively high grayscale intensity that is very close to the white background. As a result, light green colored foreground is not well distinguished from the white background, and the foreground information may become lost in a subsequent image binarization process (to generate a foreground mask, described later).

Another problem of applying the conventional color to grayscale conversion algorithm, which uses a fixed ratio of the coefficients for the R, G and B channels for all images, to document images is that sometimes a foreground and a background colors that are of different hues may be converted to very similar grayscale values, causing the foreground and background to have insufficient contrast in the grayscale image. In a simplistic and somewhat extreme example, a red foreground color (250, 0, 0) and a green background color (0, 75, 0) will be converted to virtually identical grayscale values when the 3:10:1 coefficient ratio is applied, causing the foreground and background to become indistinguishable in the resulting grayscale image, even though they are well distinguished in the original color image. This will cause problems in subsequent image processing, such as binarization.

Note that in this disclosure, as is conventional, the color values are defined such that higher values mean higher intensities of the corresponding color. In a conventional definition, the R, G and B values are between 0 and 255, where (0, 0, 0) is black and (255, 255, 255) is white. Similarly, the grayscale is defined such that higher grayscale values are closer to white. It is possible to define color value and grayscale values in other ways, but the principle of the present embodiments remains the same.

Embodiments of the present invention provide a method of converting a color image to a grayscale image that is suitable for processing color forms (or more generally, color images that represent documents) for purposes of text recognition. In one aspect, the embodiments provide a formula for converting RGB color values to grayscale values by using coefficient ratios for the RGB color channels that are different from the coefficient ratios used in conventional grayscale conversion algorithms. In another aspect, the embodiments provide a method of determining, for any given color document image, the appropriate coefficient ratios for the RGB color channels for converting the color document image to a grayscale image.

FIG. 1 schematically illustrates an image processing method for converting a color document image to a grayscale document image according to an embodiment of the present invention. Here, a document image refers to an image that represents a document containing predominantly text. Although actual documents often also contain graphics and images that have rich colors, in this disclosure, it is assumed that the original document image has been processed to segment text from graphics and images, and that the input document image contains substantially only text and relatively simple graphics, including table lines. Also, preferably, in the input document image, the background and the text are represented by relatively few colors. For example, the background may be colored but is generally uniform; the text and the simple graphics uses a relatively small number of colors. It should be noted that the input document image is not required to have the above characteristics, although the grayscale conversion method is designed to produce satisfactory results when applied to images that do have the above characteristics.

The input color image contains three primary color channels R, G and B. I.e., each pixel value of the color image is a color value (R, G, B). Each color channel effectively forms a monochrome image. The three color channels are first analyzed to determined which color channels contain the largest amount of information, the second largest amount of information, and the least amount of information, by some defined measure; such channels are respectively referred to as the most dominant color channel, the second most dominant color channel, and the least dominant color channel (step S1). The amount of information contained in each channel may be measured in a number of ways. In a preferred embodiment, the entropy of the monochrome image of each channel is used as the measure of the amount of information of each channel. Generally speaking, entropy is a statistical measure of randomness that can be used to measure the amount of information of an image or to characterize the texture of the image, etc. Greater entropy generally means more information in the image. It is noted that a uniform background contains relatively little information. The entropy (a scalar value) of a monochrome image can be calculated from a histogram of the image. Many open source libraries provide functions that can be used to calculate the entropy of a monochrome image, and one of ordinary skill in the art will readily be able to implement this calculation.

In an alternative embodiment, in lieu of entropy, the amount of information in each color channel is calculated by counting the number pixels having pixel values greater than a given threshold. The higher the number of such pixels (referred to as the effective pixel number here), the more information the channel is deemed to contain and hence the more dominant the channel is. This method of calculating the amount of information, however, often does not take into account the randomness of pixel values (for example, pixel values from a blank image), and is therefore less robust than the entropy method. Other suitable method may also be used to calculate or estimate the amount of information in each channel.

After the most dominant, the second most dominant, and the least dominant color channels are determined in step S1, the coefficients $k_R$, $k_G$, and $k_B$ for the respective R, G and B channels are determined based on which ones of the R, G and B channels are the most dominant, the second most dominant, and the least dominant color channels (step S2). The input color image is then converted to a grayscale image by using a linear combination formula to calculate the grayscale intensity I of each image pixel (step S3):

$$I=k_R R+k_G G+k_B B,$$

where R, G, B are the respective pixel values of the red, green and blue color channel of the pixel in the color image.

For step S2, in a preferred embodiment, the coefficients for the color channels are determined in the following way: the coefficient for the most dominant channel is smaller than the coefficient for the second most dominant channel, which is in turn smaller than the coefficient for the least dominant channel. For example, if the B channel is the most dominant, the R channel is the second most dominant, and the G channel is the least dominant, then the coefficients have the relationship $k_G>k_R>k_B$. If the B channel is the most dominant, the G channel is the second most dominant, and the R channel is the least dominant, then the coefficients have the relationship $k_R>k_G>k_B$. Etc. In practice, it has been observed that in many forms, the B channel tends to contain the most information and hence be the most dominant channel, but that is not a requirement of the invention.

In preferred implementations, the ratio of the coefficient for the second most dominant channel to the coefficient for the most dominant channel is approximately 3:1, or more generally, in a range of 2:1 to 4:1 inclusive; the ratio of the coefficient for the least dominant channel to the coefficient for the second most dominant channel is approximately 10:3, or more generally, in a range of 2:1 to 5:1 inclusive. For example, in the earlier example where the B channel is the most dominant, the R channel is the second most dominant, and the G channel is the least dominant, the coefficient ratio may be $k_R:k_G:k_B=3:10:1$; and in the other earlier example where the B channel is the most dominant, the G channel is the second most dominant, and the R channel is the least dominant, the coefficient ratio may be $k_R:k_G:k_B=10:3:1$. In a more general example, where the B channel is the most dominant, the G channel is the second most dominant, and the R channel is the least dominant, the coefficient ratio may satisfy $2 \leq k_R/k_G \leq 5$. It should be noted that in actual implementation, a normalization requirement may be imposed, i.e., $k_R+k_G+k_B=1$, but in the descriptions here it is sometimes omitted for convenience.

After grayscale conversion, the grayscale image is binarized to generate a binary image, i.e., an image in which the each image pixel value is either black (e.g. 0, foreground) or white (e.g. 1, background) (step S4). Any suitable method, for example an auto-thresholding method, may be used to perform the binarization step. Such a binary image, which separates the background and foreground portions of the grayscale image, is then used as a binary mask (referred to as a binary foreground mask) which is applied to the grayscale image to extract the foreground information from the grayscale image and to set the background portion to a uniform background intensity value (step S5). More specifically, for example, if a pixel of the binary mask is a foreground pixel, then the corresponding pixel of the grayscale image will have its pixel intensity value preserved; if a pixel of the binary mask is a background pixel, then the corresponding pixel of the grayscale image will have its pixel value set to a background intensity value. The resulting image is a foreground-only grayscale image that contains the foreground portions of the grayscale image while the background portion becomes a uniform background intensity value. This reduces background noise.

The foreground-only grayscale image is then used in a text recognition method to extract the text from the image (step S6). For example, if the text recognition method uses artificial neural networks, the grayscale image may be used either as a training image for network training, or as a target image that is to be recognized by a trained network. The text recognition method may also be one that does not use artificial neural networks.

It should be noted that the grayscale image generated by the grayscale conversion step S3 may be directly used in the text recognition method, without going through the foreground extraction steps S4 and S5. Using foreground-only grayscale images generated by steps S4 and S5, however, can improve image processing efficiency in the text recognition step S6.

Table I below gives a number of specific examples for a situation where the B channel is the most dominant, the G channel is the second most dominant, and the R channel is the least dominant. Example #1 to #5 use coefficient values according to embodiments of the present invention, whereas Conventional method 1 and 2 use coefficient values according to conventional methods. Note that in this Table, the coefficients are not yet normalized. In the table, the second column from the right shows approximate results of correct text recognition rate in various experiments, where the color forms are converted to grayscale using the different grayscale conversion methods and then further processed by a text recognition algorithm. The right-most column shows text recognition results by humans using the various grayscale images.

TABLE I

| | Red $k_R$ | Green $k_G$ | Blue $k_B$ | Red/Green Ratio $k_R/k_G$ | Machine Recognition Rate | Human Recognition Rate |
|---|---|---|---|---|---|---|
| Conventional method 1 | 3 | 10 | 1 | 0.30 | 70% | 95% |
| Conventional method 2 | 1 | 1 | 1 | 1.00 | 50% | 50% |
| Example #1 | 8 | 4 | 1 | 2.00 | 80% | 80% |
| Example #2 | 9 | 3 | 1 | 3.00 | 90% | 75% |
| Example #3 | 10 | 3 | 1 | 3.33 | 95% | 70% |
| Example #4 | 12 | 3 | 1 | 4.00 | 85% | 60% |
| Example #5 | 10 | 2 | 1 | 5.00 | 80% | 55% |

In these examples, because the G channel is relatively more dominant than the R channel, the green coefficient $k_G$ is smaller than the red coefficient $k_R$, which is the opposite of the conventional method where the green coefficient $k_G$ is always greater than the red coefficient $k_R$, or equal to the red coefficient $k_R$. As can be seen in the above table, the conventional method with RGB ratio of 3:10:1 works well for human visual system but poor for machine recognition. The methods according to embodiments of the present invention achieve better machine recognition rate. This is because it the methods according to embodiments of the present invention move the intensity of the green channel closer to the foreground intensity (lower luminance) so it is better preserved during binarization.

The color to grayscale conversion method described above is also useful in document image processing that does not involve text recognition. For example, color document images may be converted to grayscale images or a binary image for document storage to reduce the amount of data to be stored.

So summarize, the color to grayscale conversion described above is particularly effective when applied to document images, and can improve the performance of subsequent processing such as text recognition.

The various methods described above may be implemented in one or more computers, which includes processors that execute computer readable program codes stored computer usable non-transitory medium (e.g. memory or storage device) to carry out the various method steps described above.

It will be apparent to those skilled in the art that various modification and variations can be made in the grayscale conversion method for document image processing for text recognition of the present invention without departing from the spirit or scope of the invention. Thus, it is intended that the present invention cover modifications and variations that come within the scope of the appended claims and their equivalents.

What is claimed is:

1. A method for processing a color document image, the color document image containing red, green and blue color channels, the method comprising:

analyzing each of the red, green and blue color channels to determine which of the red, green and blue color channels are a most dominant color channel, a second most dominant color channel, and a least dominant color channel, including determining an amount of information contained in each of the red, green and blue color channels, wherein the color channel that contains the most amount of information is determined to be the most dominant color channel, the color channel that contains the second most amount of information is determined to be the second most dominant color channel, and the color channel that contains the least amount of information is determined to be the least dominant color channel;

based on the determination of which of the red, green and blue color channels are the most dominant color channel, the second most dominant color channel, and the least dominant color channel, assigning a coefficient to each of the red, green and blue color channels, wherein the coefficient assigned to the most dominant color channel is smaller than the coefficient assigned to the second most dominant color channel, and the coefficient assigned to the second most dominant color channel is smaller than the coefficient assigned to the least dominant color channel; and converting the color document image to a grayscale document image, by calculating a pixel intensity value I for each pixel of the grayscale document image using $I = k_R R + k_G G + k_B B,$ where R, G, B are respectively the pixel values of the red, green and blue color channels of the corresponding pixel of the color document image, and $k_R$, $k_G$, and $k_B$ are respectively the coefficients assigned to the red, green and blue color channels.

2. The method of claim 1, wherein the amount of information contained in each of the red, green and blue color channels is determined by calculating an entropy of the respective color channel.

3. The method of claim 1, wherein a ratio of the coefficient assigned to the second most dominant color channel to the coefficient assigned to the most dominant color channel is in a range of 2:1 to 4:1.

4. The method of claim 3, wherein a ratio of the coefficient assigned to the second most dominant color channel to the coefficient assigned to the most dominant color channel is 3:1.

5. The method of claim 1, wherein a ratio of the coefficient assigned to the least dominant color channel to the coefficient assigned to the second most dominant color channel is in a range of 2:1 to 5:1.

6. The method of claim 5, wherein a ratio of the coefficient assigned to the least dominant color channel to the coefficient assigned to the second most dominant color channel is 10:3.

7. The method of claim 1, wherein a ratio of the coefficient assigned to the second most dominant color channel to the coefficient assigned to the most dominant color channel is in a range of 2:1 to 4:1, and a ratio of the coefficient assigned to the least dominant color channel to the coefficient assigned to the second most dominant color channel is in a range of 2:1 to 5:1.

8. The method of claim 1, further comprising:
generating a binary image based on the grayscale image, the binary image separating foreground portions from background portions of the grayscale image; and
applying the binary image as a binary foreground mask to the grayscale image to extract foreground portions of the grayscale image while setting background portions of the grayscale image to a uniform background intensity value, to generate a foreground-only grayscale image.

9. The method of claim 8, further comprising recognizing text in the foreground-only grayscale image.

10. The method of claim 9, wherein when the blue color channels is the most dominant color channel and, the red color channel is the second most dominant color channel, and the green color channel is the least dominant color channel, the coefficients assigned to the red, green and blue color channels satisfy $k_R:k_G:k_B = 10:3:1$.

11. A method for processing a color document image, the color document image containing red, green and blue color channels, the method comprising:

converting the color document image to a grayscale document image, by calculating a pixel intensity value I for each pixel of the grayscale document image using $I = k_R R + k_G G + k_B B,$ where R, G, B are respectively the pixel values of the red, green and blue color channels of the corresponding pixel of the color document image, and $k_R$, $k_G$, and $k_B$ are respectively the coefficients of the red, green and blue color channels, wherein, $k_R$ and $k_G$ satisfy the following:

$2 \leq k_R/k_G \leq 5.$

12. The method of claim 11, wherein the blue color channel of the color document contains the most amount of information, the green color channel of the color document contains the second most amount of information, and the red color channel of the color document contains the least amount of information.

13. The method of claim 11, wherein $k_R$, $k_G$, and $k_B$ satisfy $k_R:k_G:k_B=10:3:1$.

14. A computer program product comprising a non-transitory computer readable storage medium having a computer readable program code embedded therein for controlling a data processing apparatus, the computer readable program code configured to cause the data processing apparatus to execute a process for processing a color document image, the color document image containing red, green and blue color channels, the process comprising:

analyzing each of the red, green and blue color channels to determine which of the red, green and blue color channels are a most dominant color channel, a second most dominant color channel, and a least dominant color channel, including determining an amount of information contained in each of the red, green and blue color channels, wherein the color channel that contains the most amount of information is determined to be the most dominant color channel, the color channel that contains the second most amount of information is determined to be the second most dominant color channel, and the color channel that contains the least amount of information is determined to be the least dominant color channel;

based on the determination of which of the red, green and blue color channels are the most dominant color channel, the second most dominant color channel, and the least dominant color channel, assigning a coefficient to each of the red, green and blue color channels, wherein the coefficient assigned to the most dominant color channel is smaller than the coefficient assigned to the second most dominant color channel, and the coefficient assigned to the second most dominant color channel is smaller than the coefficient assigned to the least dominant color channel; and converting the color document image to a grayscale document image, by calculating a pixel intensity value I for each pixel of the grayscale document image using $$I=k_R R+k_G G+k_B B,$$

where R, G, B are respectively the pixel values of the red, green and blue color channels of the corresponding pixel of the color document image, and $k_R$, $k_G$, and $k_B$ are respectively the coefficients assigned to the red, green and blue color channels.

15. The computer program product of claim 14, wherein the amount of information contained in each of the red, green and blue color channels is determined by calculating an entropy of the respective color channel.

16. The computer program product of claim 14, wherein a ratio of the coefficient assigned to the second most dominant color channel to the coefficient assigned to the most dominant color channel is in a range of 2:1 to 4:1, and a ratio of the coefficient assigned to the least dominant color channel to the coefficient assigned to the second most dominant color channel is in a range of 2:1 to 5:1.

17. The computer program product of claim 14, wherein the process further comprises:

generating a binary image based on the grayscale image, the binary image separating foreground portions from background portions of the grayscale image; and applying the binary image as a binary foreground mask to the grayscale image to extract foreground portions of the grayscale image while setting background portions of the grayscale image to a uniform background intensity value, to generate a foreground-only grayscale image.

18. The computer program product of claim 17, wherein the process further comprises recognizing text in the foreground-only grayscale image.

\* \* \* \* \*